(No Model.)
W. N. BAKER.
NUT LOCK.
No. 346,452. Patented Aug. 3, 1886.
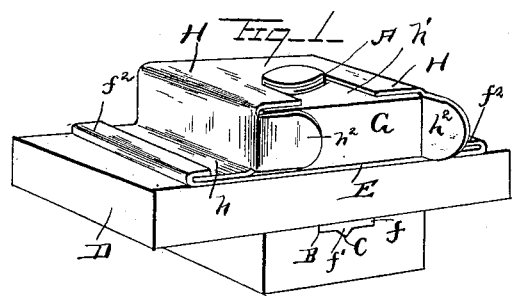
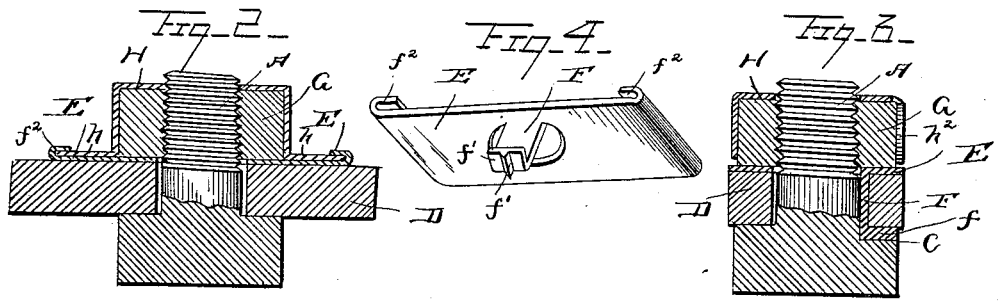
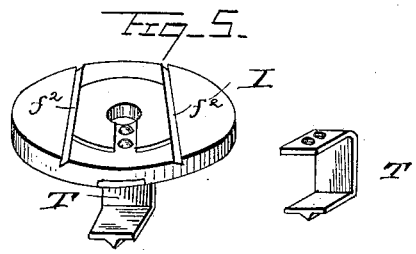
Witnesses
Inventor
Wm. N. Baker,
By his Attorneys

United States Patent Office.

WILLIAM NATHAN BAKER, OF DAMASCUS, OHIO, ASSIGNOR OF ONE-HALF TO THEODORE J. REAM, OF SAME PLACE.

NUT-LOCK.

SPECIFICATION forming part of Letters Patent No. 346,452, dated August 3, 1886.

Application filed May 20, 1886. Serial No. 202,775. (No model.)

*To all whom it may concern:*

Be it known that I, WILLIAM NATHAN BAKER, a citizen of the United States, residing at Damascus, in the county of Columbiana and State of Ohio, have invented a new and useful Improvement in Nut-Locks, of which the following is a specification.

My invention relates to an improvement in nut-locks; and it consists in the peculiar construction and combination of devices, that will be more fully set forth hereinafter, and particularly pointed out in the claims.

In the drawings, Figure 1 is a perspective view of a nut-lock embodying my improvements, showing one of the locking-lips bearing against the nut, and the other locking-lip extending outwardly. Fig. 2 is a vertical sectional view of my invention. Fig. 3 is a similar view of the same, taken on the plane at right angles to Fig. 2. Fig. 4 is a detailed perspective view of the washer. Fig. 5 is a similar view of a modified form of the washer.

A represents the bolt, in the inner side of the head of which, on one side of the shank, is made a recess, B, having a notch, C.

D represents the plate, which is provided with an opening, through which the shank of the bolt extends. This plate is here shown merely as a matter of convenience to illustrate the manner of applying my nut-lock to practical use. On the upper side of the plate D is placed a washer, E, which is provided with a downwardly-extending tongue, F, which passes through the opening in the plate and bears between the side of the opening and one side of the shank of the bolt. The lower end of this tongue is bent at right angles, and bears under the lower side of the plate D, and the lower end of the said tongue is bent outwardly under the said plate, as at $f$, and is provided with the downwardly-projecting stud $f'$. The foot $f$ enters a recess, B, in the head of the bolt, and the stud $f'$ enters the recess C of the bolt, thereby preventing the washer from being turned on the bolt, as will be very readily understood. The ends of the washer are bent over to form grooves $f^2$.

G represents the nut, which is screwed onto the outer end of the bolt and bears against the outer side of the washer. In order to prevent the said nut from turning on the end of the bolt, I provide an inclosing cap or plate, H, which is adapted to fit over the nut, and is provided at its ends with laterally-extending tongues or flanges $h$, which enter the grooves $f^2$ of the washer, thereby enabling the said cap or plate to be moved laterally on the washer and over the nut. The upper side of the said plate or cap is provided with an open slot, $h'$, which receives the upper end of the bolt, and the vertical side walls of the said plate or cap project for a slight distance from one side thereof, at the open side of the said plate or cap, thereby forming locking-lips $h^2$. When the said cap or plate has been moved so as to inclose the nut, the lips $h^2$ project beyond one side of the latter, as shown, and the said lips are then bent at right angles on the outer side of the nut, thereby locking the plate or case thereto, and preventing it from being withdrawn from the washer.

In Fig. 5 I show a modification of my invention in which I substitute a washer, I, for the washer E. Where the washer E is used against soft wood, it will be likely to be bent inwardly in tightening the nut, and thereby cause the sides and corners to be pressed upwardly and get out of shape. I therefore propose to substitute the washer I for the washer E for such uses, and form the washer I of cast or wrought metal, and of sufficient thickness to withstand the strain exerted by the nut. The washer I has the grooves $f^2$, to receive the tongues of the cap. The tongue T, which is formed integrally with the washer E, is formed separately from the washer I, and is riveted to the same, as shown.

Having thus described my invention, I claim—

1. The combination, in a nut-lock, of the washer E, having the grooves $f^2$, and the means to prevent the said washer from turning on the bolt, the nut screwed onto the bolt and bearing on the outer side of the washer, and the sliding locking plate or case H, embracing the nut and having the flanges or tongues to enter the grooves in the washer, for the purpose set forth, substantially as described.

2. The combination, in a nut-lock, of the washer E, having the grooves $f^2$, and the means to prevent the said washer from turning on the bolt, the nut screwed onto the bolt and bearing on the outer side of the washer, and the locking plate or case H, embracing the nut, having the flanges or tongues to enter the grooves in the washer, and having the lips $h^2$, adapted to be bent on the outer side of the nut to prevent the case or locking-plate from being withdrawn therefrom, substantially as described.

3. The combination, in a nut-lock, with the bolt having the recess in its head, of the washer having the tongue bearing in said recess to prevent the said washer from turning on the bolt, the washer being also provided with the grooves $f^2$, the nut screwed onto the bolt and bearing on the outer side of the washer, and the locking plate or case H, embracing the nut, having the flanges or tongues to enter the grooves in the washer, substantially as described.

In testimony that I claim the foregoing as my own I have hereto affixed my signature in presence of two witnesses.

WILLIAM NATHAN BAKER.

Witnesses:
HENRY C. JONES,
L. C. HOLE.